United States Patent [19]

Auth

[11] E Patent Number: Re. 31,941

[45] Reissued Date of Patent: Jul. 9, 1985

[54] MULTIPLEX INTERFEROMETER

[75] Inventor: Gerald L. Auth, Laguna Beach, Calif.

[73] Assignee: The Gerber Scientific Instrument Company, Windsor, Conn.

[21] Appl. No.: 812,590

[22] Filed: Jul. 5, 1977

Related U.S. Patent Documents

Reissue of:

[64] Patent No.: 3,936,193
Issued: Feb. 3, 1976
Appl. No.: 442,254
Filed: Feb. 13, 1974

[51] Int. Cl.[3] ..... G01B 9/02; G02B 7/02

[52] U.S. Cl. ..... 356/346; 350/255

[58] Field of Search ..... 356/345, 346; 250/255, 250/442, 254

[56] References Cited

U.S. PATENT DOCUMENTS

| | | | |
|---|---|---|---|
| 908,725 | 1/1909 | Ashley | 356/106 R |
| 1,709,809 | 4/1929 | Rashevsky | 356/106 R |
| 2,258,355 | 10/1941 | Douglass | 356/123 |
| 2,580,498 | 1/1952 | Ackerlind | 356/106 R |
| 2,948,152 | 8/1960 | Meyer | 356/106 R |
| 3,488,123 | 1/1970 | Nichols | 356/106 S |
| 3,728,030 | 4/1973 | Hawes | 356/106 S |

*Primary Examiner*—Bruce Y. Arnold
*Attorney, Agent, or Firm*—Flehr, Hohbach, Test, Albritton & Herbert

[57] ABSTRACT

An interferometer for analyzing electromagnetic frequency spectra including a movable mirror supported on two air bearings such that the center of support of the bearings continuously coincides with the center of gravity of the movable mirror during the motion of the mirror. The air bearings engage two parallel, spaced apart lateral rods that maintain the optical alignment of the mirror. To facilitate making spectral measurements, the interferometer also incorporates a laser for producing monochromatic light that is directed through a primary beam splitter to provide a periodic fringe pattern as the mirror moves and a white light directed through a secondary beam splitter to provide a reproducible reference point.

25 Claims, 7 Drawing Figures

MULTIPLEX INTERFEROMETER

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to light measuring apparatus and more particularly to optical interferometers used for electromagnetic frequency spectrum analysis.

2. Description of the Prior Art

Interferometers have been used for many years to measure and to analyze the frequency spectra of electromagnetic radiation. In particular, optical interferometers are commonly used to compute spectroscopic data such as line positions, intensities, and absorption coefficients. Interferometers are also used to monitor chemical processes, to identify the composition of gaseous samples at very low concentrations, and to plot the spectral signatures of remote emission plumes and thermal sources.

One type of interferometer in use today is the Michelson interferometer. The Michelson interferometer includes a half-silvered mirror or beam splitter placed at an angle of 45° with respect to the electromagnetic radiation being measured. The beam splitter divides the radiation into two parts, and each part is directed along a separate perpendicular path within the interferometer. One part of the radiation is reflected off of a fixed mirror while the other part is reflected off of a movable mirror. The two parts are thereafter recombined at the beam splitter and optically interfere with each other to a degree proportional to their phase displacement. The phase displacement between the two parts is generated by the inequality in the path lengths between the movable mirror and fixed mirror.

Although the basic principles and general operation of Michelson interferometers are well known, most of these instruments have mechanical limitations and operational handicaps. For example, during operation most interferometers develop substantial vibrations that interfere with the spectral measurements. These vibrations are generated either by the motor and drive line for the movable mirror or from the bearings supporting the movable mirror. Further, the prior art interferometers cannot quickly damp out these vibrations once developed. Also, these prior art instruments cannot be subjected to either rugged environments, mechanical shock or wide temperature variations; and any occurrence thereof usually requires extensive readjustment of the instrument and repetition of the measurements.

SUMMARY OF THE INVENTION:

The multiplex interferometer is a Michelson interferometer wherein the movable mirror is mounted on a moving carriage that is supported by two air bearings. The air bearings are so located with respect to the movable mirror and the carriage that the combined center of gravity of the mirror and the carriage is continuously coincident with the center of support of the bearings throughout the complete range of motion of the movable mirror. In addition, the interferometer is mounted within a housing that not only provides rigid support for the apparatus, but also accommodates thermal expansion and absorbs any mechanical shock to the instrument. To facilitate making spectral measurements, the interferometer also incorporates a gas laser directed onto the beam splitter to generate periodic fringe patterns and a white light source to provide a reference point for the system.

Accordingly, the primary object of the present invention is to provide a rigid, tubular frame construction for an interferometer and a symmetrically balanced carriage for the movable mirror. Together the tubular frame and the symmetrically balanced carriage permit exacting control of the movable mirror.

A second object of the present invention is the elimination of tilt, irregularity, and vibration from the optics of an interferometer thereby permitting the movable mirror to negotiate a long path length without perceptible motion at the center of the interference pattern.

Additional objects and features of the present invention will appear from the following description in which the preferred embodiments of the invention have been set forth in detail in conjunction with the accompanying drawings.

Figures 1, 5:
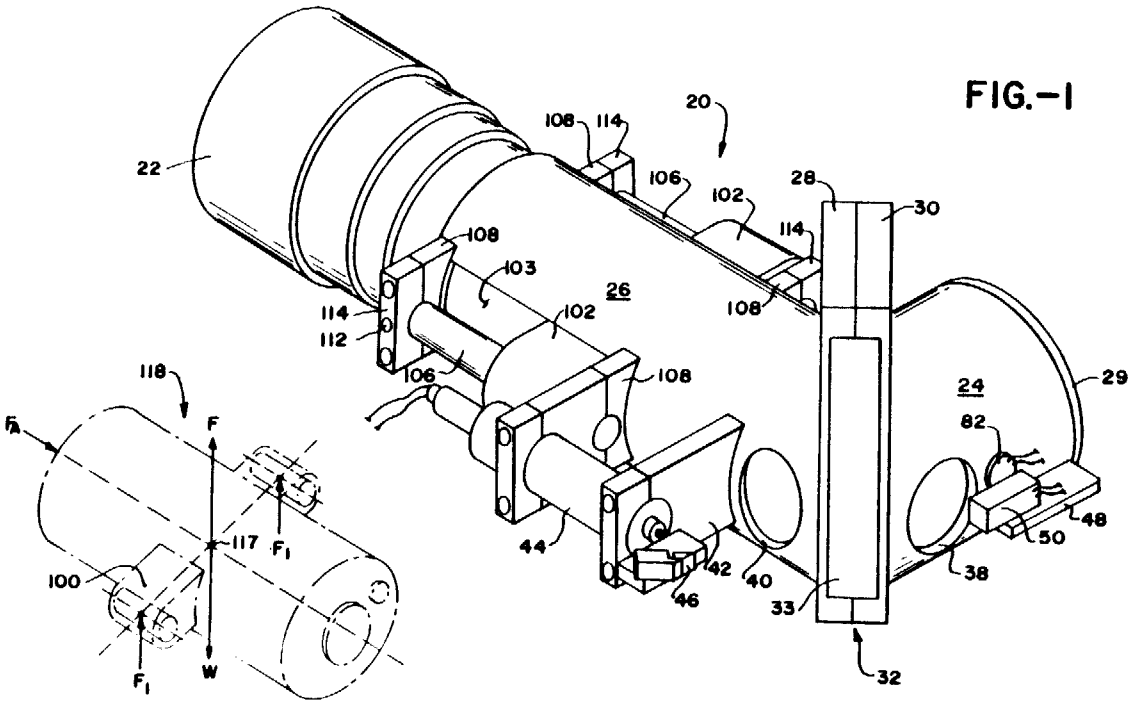
FIG. 1 is an isometric view of a multiplex interferometer having a symmetrical carriage for a movable mirror and a gas laser directed into a beam splitter according to the present invention.
FIG. 5 is a force diagram illustrating the relative locations and directions of the forces acting on the carriage of the movable mirror of the multiplex interferometer of FIG. 1.

DESCRIPTION OF THE PREFERRED EMBODIMENTS:

Referring generally to FIGS. 1–4, reference numeral 20 indicates a multiplex interferometer comprising a linear motor 22, a fixed mirror arm 24 and a movable mirror arm 26. The linear motor is a conventional electromagnetic linear actuator such as is, for example, normally used for positioning magnetic read/write heads on computer disc memories. The linear motor has an electrical control circuit hereinafter described and is rigidly attached to the movable mirror arm 26. The movable mirror arm is a cylindrical tube having a mounting flange for the linear motor at one end thereof and a 45° flange at the other end. The multiplex interferometer 20 is supported by three feet 25 disposed below the movable mirror arm 26 and a motor mounting (not shown) on the linear motor 22. The feet 25 are designed to provide stable and nontiltable support. The fixed mirror arm 24 is also a cylindrical tube but has an end plate 29 at one end and a complementary 45° flange at the other end. The end plate 29 on the fixed mirror arm fully covers the end of the arm and provides an internal mounting base for a fixed mirror mounting hereinafter described.

Figure 2:
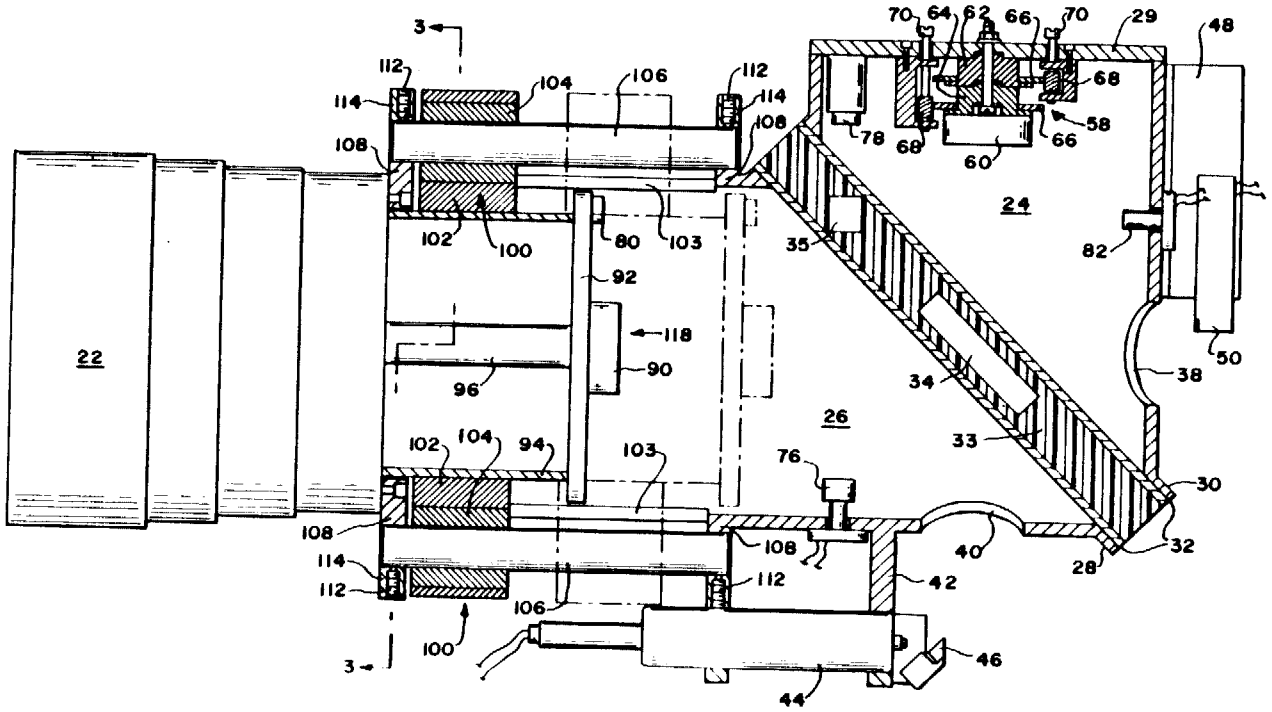
FIG. 2 is a plan view partially in horizontal cross-section illustrating the internal arrangement of the components within the multiplex interferometer of FIG. 1.

The two complimentary 45° flanges 28, 30 perpendicularly mate the arms 24, 26 together and are each machined to very critical tolerances in order to maintain the optical alignment required between the fixed mirror arm 24 and the movable mirror arm 26. Each 45° flange has a central portion that is relieved to form a rectangular channel. When the two 45° flanges are mated together, the two rectangular channels form a beam splitter holder 32. The beam splitter holder is a rectangular slot located at an angle of 45° with respect to the longitudinal axis of each of the arms 24, 26. Referring to FIGS. 1 and 2, the beam splitter holder 32 is designed to permit the installation and removal of a beam splitter plate 33. The beam splitter plate is a rectangular, opaque retainer for a primary beam splitter 34 and a secondary beam splitter 35. The primary beam splitter is a partially transparent and partially reflective material that splits the incident electromagnetic radiation being measured into two parts as hereinafter described. The secondary beam splitter 35 is a partially transparent and partially reflective material that splits white light into two parts as hereinafter described. Beam splitters can be fabricated from a variety of materials including quartz, calcium fluoride, potassium bromide, and Mylar. The unobstructed rectangular slot of the beam splitter holder 32 allows the various beam splitters to be easily interchanged.

Located on the side wall of the fixed mirror arm 24 near the 45° flange 30 is an entrance port 38 through which the incident electromagnetic radiation being measured enters the multiplex interferometer 20. The entrance port 38 is a generally circular hole located with respect to the primary beam splitter 34 so that the electromagnetic radiation is incident thereon at an angle of precisely 45° with the flat surface. Located oppositely on the side wall of the movable mirror arm 26 near the 45° flange 28 is an exit port 40 through which the recombined electromagnetic radiation leaves the interferometer. The exit port 40 is also a generally circular hole and is located with respect to the primary beam splitter 34 so that the electromagnetic radiation, recombined and reflected from the primary beam splitter, is directed out through the exit port 40.

Mounted on the side wall of the movable mirror arm 26 near the exit port 40 on two brackets 42 is a conventional laser 44. The laser must be selected to generate radiation in a frequency range that will not interfere with the radiation being measured. In one embodiment of the present invention a helium-neon laser was used, operating at 6328 angstroms. The laser emits essentially monochromatic electromagnetic radiation in a direction toward the 45° flange 28 and parallel to the longitudinal axis of the movable mirror arm 26. The radiation is thereafter directed through the exit port 40 by a laser prism 46 mounted on a bracket 48. The laser prism is a conventional deflecting prism that reflects the laser beam onto the primary beam splitter 34. Mounted oppositely on the side wall of the fixed mirror arm 24 near the entrance port 38 is a laser fringe counter 50. The beam from the laser is used to generate fringe patterns in the interferometer as hereinafter described and the laser fringe counter 50 counts the occurrence of these fringe patterns as the movable mirror moves.

Within the fixed mirror arm 24 on the inside of the end plate 29 is an adjustable mounting 58 for a fixed mirror 60. The fixed mirror is a circular, first surface mirror located in registry with the exit port 40 and with flat surface of the primary beam splitter 34 at an angle of 45°. During optical measurements the fixed mirror is stationary but can be adjusted by two complimentary double wedges 62, 64. The double wedges are individually rotatable with respect to each other by two worm wheels 66 attached thereto. Each worm wheel is rotatable by a worm gear 68 attached to a shaft 70. The shaft extends through the end plate 29 and is rotatable by a screw driver or other conventional means. The two counter rotating double wedges 62, 64 provide the only adjustment required for the multiplex interferometer.

Between the laser 44 and the side wall of the movable mirror arm 26 is located a white light source 76. The white light source provides collimated white light that is directed onto the secondary beam splitter 35. Attached to the end plate 29 of the fixed mirror arm 24 and directly opposite to the white light source 76 is a stationary white light mirror 78. The stationary white light mirror is located in registry with the secondary beam splitter 35 and the white light source 76. Located orthogonally between the white light source 76 and the stationary white light mirror 78 and directly opposite from the secondary beam splitter 35 is a movable white light mirror 80. The movable white light mirror is mounted for movement with the movable mirror hereinafter described. Both the movable white light mirror 80 and the stationary white light mirror 78 are conventional first surface reflecting mirrors that reflect the light from the white light source 76 back to the secondary beam splitter 35. Located between the laser fringe counter 50 and the side wall of the fixed mirror arm 24 is a white light detector 82. The white light detector is a photo sensitive cell positioned in registry with the secondary beam splitter 35 and the movable white light mirror 80. The white light detector measures the amount of white light incident on its sensitive surface. The white light source, the associated mirrors and the detector are used to provide a reference point for spectral measurements.

The multiplex interferometer 20 also contains a movable mirror 90 within the movable mirror arm 26. The movable mirror is a conventional first surface reflecting mirror located in registry with the entrance port 38 and with the flat surface of the primary beam splitter 34 at an angle of 45°. The movable mirror is rigidly mounted on a front plate 92 and is continuously maintained during its motion in precise orthogonal alignment with the fixed mirror 60. Also rigidly mounted on the front plate is the movable white light mirror 80 hereinbefore described. The front plate is rigidly attached to a transportation cylinder 94. The linear motor 22 reciprocally drives the transportation cylinder 94 along the longitudinal axis of the movable mirror arm 26 while maintaining the precise orthogonal alignment between the two mirrors. Located within the transportation cylinder 94 and coaxially attached thereto is a transportation rod 96 used to measure the velocity of the movable mirror as hereinafter described.

Figure 3:
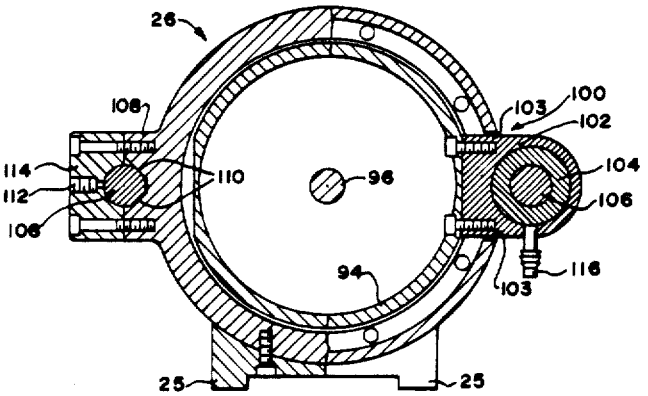
FIG. 3 is a cross-sectional view taken along line 3—3 of FIG. 2.
Figure 4:
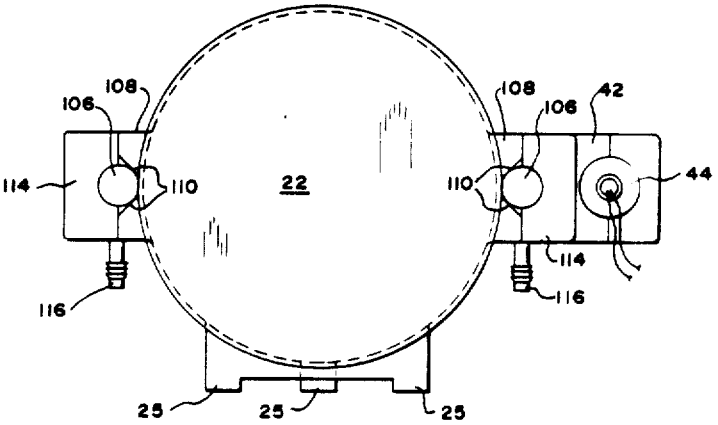
FIG. 4 is an end elevational view of the multiplex interferometer of FIG. 1.

Referring more particularly to FIGS. 2–4, the movable mirror 90, the front plate 92, the transportation cylinder 94 and the transportation rod 96 are supported and maintained in optical alignment by a carriage 100. The carriage includes two supporting arms 102 rigidly attached in opposed relationship to the transportation cylinder 94. The supporting arms extend through two longitudinal slots 103 in the side walls of the movable mirror arm 26 and permit horizontal, reciprocal motion of the movable mirror 90. Within each supporting arm is an air bearing 104 that supports the carriage 100 about two lateral rods 106. When the movable mirror 90 travels within the movable mirror arm 26, the carriage 100 slides along the stationary lateral rods but remains out of frictional contact therewith because of the two air bearings. Each air bearing provides a cushion of air between the lateral rod and the supporting arm. Reference numeral 116 indicates two air fittings that are connected to an air supply (not shown) for providing air to the air bearings.

The two lateral rods 106 are stainless steel, centerless ground rods that maintain the optical alignment of the movable mirror with respect to the interferometer. The lateral rods are both aligned in parallel, spaced apart relationship with the longitudinal axis of the movable mirror arm 26. The precise alignment of the two lateral rods 106 is maintained by four V-blocks 108 that are part of the side walls of the movable mirror arm 26. Each V-block has a pair of opposed, inclined edges 110 that are accurately machined to maintain the optical alignment of the lateral rods 106. Each edge is further relieved so that only point contact is made between the edge and the lateral rod. Each lateral rod is pressed against each set of V-block edges 110 by a spring loaded pin 112 contained within a retaining cap 114 on the V-block 108. It should be appreciated that the lateral rods are not longitudinally restrained and can thermally expand independently of the movable mirror arm 26.

Referring to FIG. 5, reference letter W indicates the resultant weight force acting through the center of gravity (C/G) 117 of the movable assembly 118. The movable assembly includes all of the components both transported by the linear motor 22 and also supported by the air bearings 104. These components include the movable mirror 90, the movable white light mirror 80, the front plate 92, the air bearings 104, the transportation cylinder 94, and the transportation rod 96. The entire weight W of the movable assembly is carried by the two bearings and the supportive forces exerted by these bearings on the supporting arms 102 are indicated by reference letters F1. The two supportive forces F1 acting on the supporting arms 102 can be resolved by vector addition into one resultant supportive force F acting at a point called the center of support (C/S) also at 117.

It should be appreciated that the supporting arms 102 act like trunnions for the movable assembly. The position of the supporting arms along the longitudinal axis of the movable assembly is precisely located so that the center of gravity (C/G) of the assembly exactly coincides with the center of support (C/S) and the resultant supportive force F exactly balances the weight force W. If, for example, the movable mirror 90 at the front of the movable assembly were made heavier, then the supporting arms could be shifted forward until the center of support coincided with the new center of gravity. By locating the center of support coincident with the center of gravity, any acceleration forces or vibrations acting on the interferometer will not form couples and torques that can tilt the movable mirror during operation.

The linear motor 22 transports the movable assembly 118 by applying a force thereto indicated by reference letters $F_A$. Since the supporting arms 102 act like trunnions for the movable assembly, the supporting arms are also vertically positioned so that the force $F_A$ is exerted through the center of support (C/S) and the center of gravity (C/G) at 117. When the force $F_A$ acts through these two centers, no couples or torques are generated thereby that could tilt the mirror when driven along its path of movement during operation.

It should be appreciated that the geometrical arrangement of the two lateral rods 106 at each side of the movable assembly 118 provides a symmetrical support for the movable assembly. Each rod is precisely aligned in parallel with the longitudinal path of the movable assembly 118. Together both lateral rods guide and support the movable mirror 90 throughout its motion and are arranged so that the center of gravity (C/G) of the movable assembly continuously coincides with the center of support (C/S) throughout the motion.

Figure 6:
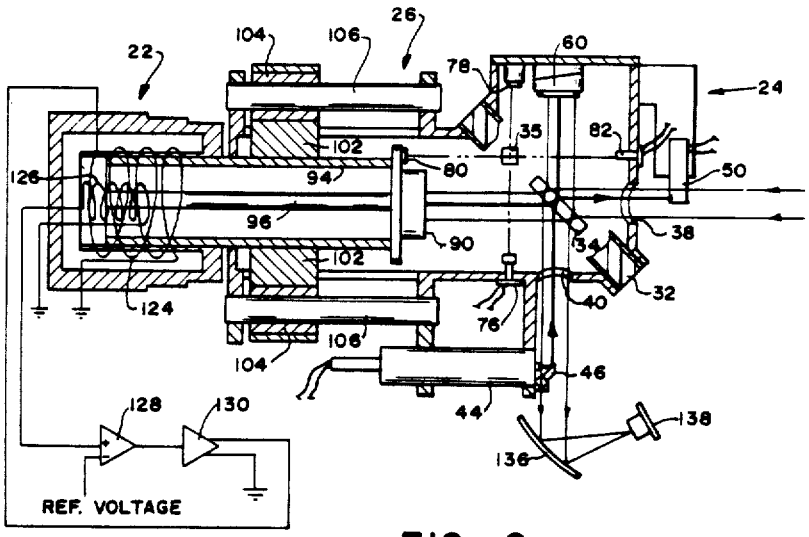
FIG. 6 is a diagrammatic plan view partially in section with certain parts being broken away illustrating the electrical components and optical paths of the multiplex interferometer of FIG. 1.

Referring to FIG. 6, the linear motor 22 moves the transportation cylinder 94 and, in turn, the movable mirror 90 with a main drive coil 124. The speed at which the linear motor transports the movable mirror is measured by a sensing coil 126. The sensing coil surrounds the transportation rod 96 and the motion of transportation rod therethrough generates a velocity signal. The output of the sensing coil is connected to a preamplifier 128, and the preamplifier 128 compares the velocity signal from the sensing coil with a reference voltage. The preamplifier generates an error signal indicating that the movable mirror is either traveling too fast or too slow. The output from the preamplifier is connected to a power amplifier 130 that drives the main drive coil 124 of the linear motor. The velocity error signal from the preamplifier causes the power amplifier to correct the speed of movable mirror. As described, the circuit comprising the sensing coil 126 and the preamplifier 128 is a velocity [tact] *tach* that forms a closed loop, driving system for the linear motor. The circuit is used to eliminate high frequency vibrations from the motion of the movable mirror assembly 118 and to stabilize the velocity of the movable mirror 90.

To operate the interferometer 20, the beam splitter plate 33 is first inserted into the beam splitter holder 32. The beam splitter plate contains the primary beam splitter 34 selected for the range of wavelengths being measured. The incident radiation enters the interferometer through the entrance port 38 and thereafter falls on the primary beam splitter 34 at an angle of 45°. The primary beam splitter separates the incident radiation into two parts. Each part of the radiation is directed along a different path within the interferometer. One part of the radiation travels through the primary beam splitter and is incident upon the movable mirror 90. The other part of the radiation is reflected off of the primary beam splitter and is incident on the fixed mirror 60. Thereafter, each part of the radiation is reflected from the respective mirrors back to the primary beam splitter where both parts of the radiation are recombined. The length of the path traveled by the radiation reflected off of the fixed mirror is constant. In contrast, the length of the path traveled by the radiation reflected off of the movable mirror is variable because the mirror moves longitudinally in the interferometer. If the paths traveled by the two separate parts are indentical in length, then the recombined radiation will be identical to the original, incident radiation. All of the waves will be in phase, and there will be minimum energy loss. If, however, one part has traveled further than the other part, then on recombination the waves will be out of phase to some degree depending on the wave lengths of the radiation. The waves from one part will interfere with and attenuate the waves from the other part. When the inequality in path lengths is such that the waves having a particular wave length are 180° out of phase, on recombination the waves having that particular wavelength will cancel each other out, and there will be maximum energy loss to the radiation having that wavelength. In actual practice the radiation incident on the interferometer has a plurality of wave lengths, and as the movable mirror is transported through the movable mirror arm 26, the waves having first the shortest and then the progressively longer wavelengths exhibit the attenuation and cancellation hereinbefore described.

The recombined radiation is reflected by the primary beam splitter 34 out of the interferometer through the exit port 40 and onto a focusing mirror 136. The focusing mirror reflects the radiation onto a light sensitive detector 138. The detector generates a fluctuating electrical signal proportional to the energy of the radiation incident thereon. The output of the detector is called an interferogram and represents the energy received by the detector as the movable mirror 90 travels longitudinally in the interferometer.

The movable mirror assembly 118 is transported longitudinally through the movable mirror arm 26 by the linear motor 22. The motion of the movable mirror assembly is smooth and continuous. The speed of the movable assembly is controlled by the velocity tact that regulates the output of the power amplifier 130 to the linear motor. The movable assembly is supported by two air bearings 102 on the two lateral rods 106. The lateral rods maintain the orthogonal alignment of the movable mirror 90 with respect to the fixed mirror 60 throughout the motion of the movable assembly. All of the components of the interferometer with the exception of the mirrors, beam splitters and lateral rods 106 are constructed from the same aluminum alloy. By utilizing the same alloy throughout, compensation for thermal expansion is eliminated.

The white light source 76 generates a collimated white light that is incident on the secondary beam splitter 35. In the same manner as hereinbefore described, the white light is separated into two parts, and the two parts are reflected off of the stationary white light mirror 78 and the movable white light mirror 80. The two parts are thereafter reflected back to the secondary beam splitter, recombined and transmitted to the white light detector 82. The white light detector generates a signal proportional to the energy of the radiation incident thereon. Because the distribution of the wave lengths of white light is well known and because a consistently repeatable interferogram can be made, the white light source, the detector and the associated mirrors provide a reference point during the spectral measurements.

The helium-neon laser 44 generates essentially monochromatic radiation. The laser mirror 46 directs the monochromatic radiation onto the primary beam splitter 34. In the same manner as hereinbefore described, the monochromatic radiation travels exactly the same path in reverse as the incident radiation being measured. The recombined laser beam is transmitted through the entrance port 38 to the fringe counter 50. The laser fringe counter counts the number of interferece fringes generated by the motion of the movable mirror 90 as the mirror travels through the movable mirror arm 26.

Figure 7:
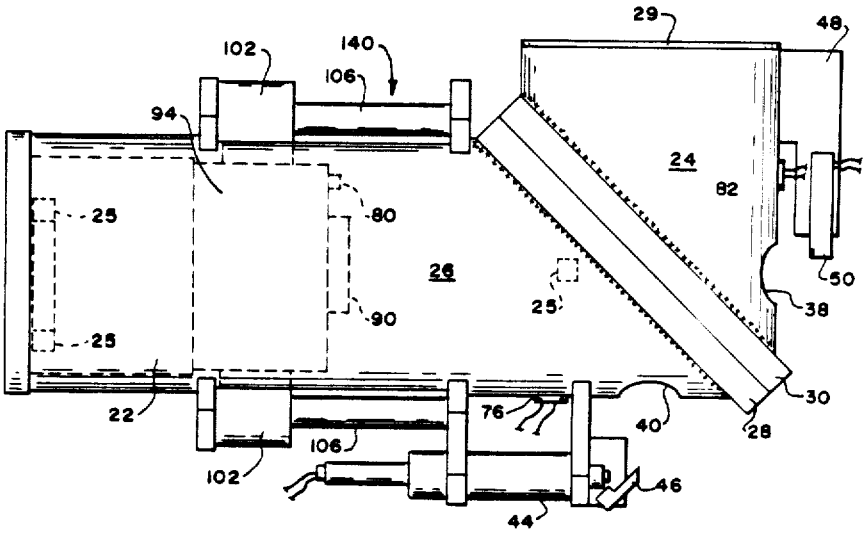
FIG. 7 is a plan view of a multiplex interferometer having an internal motor and a motor mounting assembly according to an alternative embodiment of the present invention.

Referring to FIG. 7 reference numeral 140 indicates an interferometer according to an alternative embodiment of the present invention. In the alternative embodiment the linear motor 22 is fully contained within the movable mirror arm 26. The interferometer 140 is supported on just three feet 25 and the linear actuator motor mounting is eliminated. The construction and operation of the remaining elements of the interferometer 140 is identical to the interferometer 20 disclosed hereinbefore. By mounting the linear motor within the movable mirror arm, the length of the arm can be substantially reduced. When the length is reduced, the interferometer can be supported on just three feet, and substantial stability and resistance to vibration are achieved thereby.

In both embodiments it should be appreciated that the two circular cylindrical tubes of the mirror arms 24, 26 and the two 45° flanges 28, 30 form a rigid, inflexible structure for the interferometer. By using circular cylindrical tubes in the manner described hereinabove, the interferometer is able to resist physical impact and also vibrations having wave lengths as small as the wave lengths of the radiation being measured. Further, by using a symmetrically balanced movable assembly 118 that maintains both the center of gravity continuously coincident with the center of support and also the accelerating force $F_A$ acting through these two centers, torques and couples are prevented from forming about the movable mirror. Thus, tilt, irregularity, and vibration are eliminated from the optics of the interferometer.

While a specific disclosure and embodiments have been shown herein, it should be realized that many modifications and changes can be made by those skilled in the art without departing from the spirit of the present invention. For example, a plurality of rods and supporting arms can be substituted for the two lateral rods 106 and associated supporting arms 102 while still maintaining the center of gravity of the movable mirror assembly 118 continuously coincident with the center of support. Accordingly, the scope of this invention should be understood in a broader context limited only by the following claims as interpreted in the light of the foregoing examples.

I claim:

1. An interferometer for measuring the spectra of incident electromagnetic radiation, comprising:

a. a rigid frame for supporting the interferometer;

b. a fixed mirror assembly having a reflecting surface thereon adjustably mounted to said rigid frame;

c. a mirror assembly movably mounted on said rigid frame and having a reflecting surface thereon orthogonally disposed to said fixed mirror;

d. a beam splitter mounted on said rigid frame for separating the incident radiation into two parts and for subsequently recombining the two parts after reflection from the fixed mirror and the movably mounted mirror;

e. means for movably supporting said movably mounted mirror assembly on said frame;

f. means for providing a center of support for the movable mirror assembly continuously coincident with the center of gravity of said mirror assembly throughout the range of movement; and g. means mounted on said frame for transporting the movable mirror assembly with respect to the fixed mirror assembly and the beam splitter by providing a force exerted through the coincident center of support and center of gravity.

2. The interferometer as claimed in claim 1 wherein the linear transporting means comprises:

a. a linear motor for transporting the movable mirror assembly;

b. a sensing coil operatively connected to the supporting means for measuring the speed of the mirror assembly; and c. means connected to said speed sensing coil for stabilizing the speed of the linear motor in response thereto.

3. The apparatus of claim 1 wherein the support providing means includes:

a. a transportation assembly powered by the linear transportation means and rigidly connected to the movable mirror assembly; and b. two laterally disposed, supporting arms rigidly attached to the transportation assembly and operatively connected to the supporting means.

4. The apparatus of claim 1 wherein the means for movably supporting the movably mounted mirror assembly includes;

a. two parallel, spaced apart, lateral rods mounted on a frame and cooperating with the support providing means for maintaining the reflecting surface on the movable mirror assembly orthogonal to the reflecting surface on the fixed mirror assembly.

5. A method for measuring the spectra of incident electromagnetic radiation, comprising the steps of:

a. providing a movable mirror orthogonally disposed with respect to a fixed mirror;

b. mounting a beam splitter in optical alignment between the movable mirror and the fixed mirror so that incident radiation on the beam splitter is directed to both said mirrors;

c. separating incident radiation into two parts using said beam splitter, one of said parts being incident on the movable mirror and the other of said parts being incident on the fixed mirror;

d. recombining the radiation after reflection from said mirrors;

e. transporting said movable mirror along the path of the radiation thereon using a linear motor and by providing a force therewith; and f. supporting the movable mirror with a center of support continuously coincident with the center of gravity of said mirror throughout the range of transportation of said mirror, said force provided by the linear motor being exerted through the coincident center of support and center of gravity.

6. The method of claim 5 wherein the step of supporting the movable mirror throughout the range of transportation includes the step of:

a. counter balancing the movable mirror with a transportation assembly operatively connected to the linear motor, whereby the center of support remains continuously coincident with the center of gravity of said mirror.

7. An interferometer for measuring the spectra of incident electromagnetic radiation, comprising;

a. a first circular cylindrical tube having an end plate at one end and a 45° flange at the other end;

b. a second circular cylindrical tube having a motor mounting at one end and a second 45° flange at the other end, said first cylindrical tube being rigidly attachable to said second cylindrical tube at the 45° flanges;

c. a fixed mirror assembly having a reflecting surface thereon adjustably mounted to said end plate on the first tube;

d. a movable front plate assembly having a reflecting surface thereon disposed in the second tube orthogonal to the fixed mirror;

e. a beam splitter mountable between said first and second tubes at said 45° flanges, said beam splitter being optically aligned with the incident electromagnetic radiation, the reflecting surface on the fixed mirror assembly, and the reflecting surface on the movable mirror assembly;

f. means mounted on said second tube for linearly transporting the reflecting surface located on the movable front plate assembly with respect to both the reflecting surface located on the fixed mirror assembly and the beam splitter;

g. two parallel horizontally spaced apart lateral rods disposed in V-blocks on the side walls of the second tube, each of said rods being disposed parallel with the longitudinal axis of the second tube;

h. two horizontally opposed supporting arms mounted to the front plate assembly each having a cylindrical hole therethrough, said holes being coaxial with the lateral rods; and i. two frictionless bearings mounted within the holes on the supporting arms and supporting the movable front plate assembly in alignment with the lateral rods, whereby the center of support of the frictionless bearings is coincident with the center of gravity of the movable front plate assembly.

8. An interferometer as claimed in claim 7 wherein the cylindrical tubes, the fixed mirror assembly, the front plate assembly, and the supporting arms are all fabricated from a common alloy.

9. An interferometer as claimed in claim 7 wherein said lateral rods are retained within the V-blocks by spring pins, thereby permitting compensation for the thermal expansion of the rods with respect to the interferometer.

10. An interferometer as claimed in claim 7 wherein said lateral rods are centerless ground stainless steel cylinders.

11. An interferometer as claimed in claim 7 further including a focusing mirror and a detector for detecting and measuring the interference patterns generated by the interferometer.

12. An interferometer for measuring the spectra of incident electromagnetic radiation, comprising:

a. first and second enclosed arms joined together with two flanges such that the arms make right angles with each other;

b. a beam splitter mounted at said flanges in optical alignment with said first and second arms;

c. a fixed mirror disposed in said first arm;

d. means for adjustably mounting said fixed mirror so that the orientation thereof can be precisely aligned with respect to the second arm;

e. a movable mirror disposed in said second arm;

f. means for mounting said movable mirror for movement toward and away from said beam splitter;

g. four mounting blocks integrally formed with said second arm and each having V-grooves precisely cut therein, two of said blocks being disposed in registry on one side of said second arm and two of said blocks being disposed in registry on the other side of said second arm;

h. two cylindrical rods laterally disposed in parallel spaced apart relationship by the V-grooves in said mounting blocks; and i. two bearings supporting the means for mounting the movable mirror on the two cylindrical rods.

*13. An interferometer for measuring the spectra of incident electromagnetic radiation, comprising:*

*a. a rigid frame for supporting the interferometer and including first and second circular cylindrical hollow arms;*

*b. a fixed mirror assembly having a reflecting surface thereon adjustably mounted to said first arm of said rigid frame;*

*c. a mirror assembly movably mounted in said second arm of said rigid frame and having a reflecting surface thereon orthogonally disposed to said fixed mirror;*

*d. a beam splitter mounted between said first and second arms on said rigid frame for separating the incident radiation into two parts and for subsequently recombining the two parts after reflection from the fixed mirror and the movably mounted mirror;*

*e. means for movably supporting said movably mounted mirror assembly said second arm on said frame;*

*f. means for providing a center of support for the movable mirror assembly continuously coincident with the center of gravity of said mirror assembly throughout the range of movement, and*

*g. means mounted on said frame for transporting the movable mirror assembly with respect to the fixed mirror assembly and the beam splitter by providing a force exerted through the coincident center of support and center of gravity, said means mounted on said frame for transporting the movable mirror assembly including a motor disposed solely within said second arm for transporting the movable mirror.*

*14. The interferometer as claimed in claim 13 wherein the transporting means comprises:*

*a. a linear motor for transporting the movable mirror assembly;*

*b. a sensing coil operatively connected to the supporting means for measuring the speed of the mirror assembly; and*

*c. means connected to said speed sensing coil for stabilizing the speed of the linear motor in response thereto.*

*15. The apparatus of claim 13 wherein the support providing means includes:*

*a. a transportation assembly powered by the transportation means and rigidly connected to the movable mirror assembly; and*

*b. two laterally disposed, supporting arms rigidly attached to the transportation assembly and operatively connected to the supporting means.*

*16. The apparatus of claim 13 wherein the means for movably supporting the movably mounted mirror assembly includes:*

*a. two parallel, spaced apart, lateral rods mounted on a frame and cooperating with the support providing means for maintaining the reflecting surface on the movable mirror assembly orthogonal to the reflecting surface on the fixed mirror assembly.*

*17. A method for measuring the spectra of incident electromagnetic radiation, comprising the steps of:*

*a. providing a movable mirror in a first arm orthogonally disposed with respect to a fixed mirror in a second arm;*

*b. mounting a beam splitter in optical alignment between the movable mirror and the fixed mirror so that incident radiation on the beam splitter is directed to both said mirrors;*

*c. separating incident radiation into two parts using said beam splitter, one of said parts being incident on the movable mirror and the other of said parts being incident on the fixed mirror;*

*d. recombining the radiation after reflection from said mirrors;*

*e. transporting said movable mirror along the path of the radiation thereon using a linear motor disposed solely within said first arm and by providing a force therewith; and*

*f. supporting the movable mirror with a center of support continuously coincident with the center of gravity of said mirror throughout the range of transportation of said mirror, said force provided by the linear motor being exerted through the coincident center of support and center of gravity.*

*18. The method of claim 17 wherein the step of supporting the movable mirror throughout the range of transportation includes the step of:*

*a. counter balancing the movable mirror with a transportation assembly operatively connected to the linear motor, whereby the center of support remains continuously coincident with the center of gravity of said mirror assembly.*

*19. An interferometer for measuring the spectra of incident electromagnetic radiation, comprising;*

*a. a first circular cylindrical tube having an end plate at one end and a 45° flange at the other end;*

*b. a second circular cylindrical tube having a motor mounting at one end and a second 45° flange at the other end, said first cylindrical tube being rigidly attachable to said second cylindrical tube at the 45° flanges;*

*c. a fixed mirror assembly having a reflecting surface thereon adjustably mounted to said end plate on the first tube;*

*d. a movable front plate assembly having a reflecting surface thereon disposed in the second tube orthogonal to the fixed mirror;*

*e. a beam splitter mountable between said first and second tubes at said 45° flanges, said beam splitter being optically aligned with the incident electromagnetic radiation, the reflecting surface on the fixed mirror assembly, and the reflecting surface on the movable mirror assembly;*

*f. means mounted solely within said second tube for linearly transporting the reflecting surface located on the movable front plate assembly with respect to both the reflecting surface located on the fixed mirror assembly and the beam splitter;*

*g. two parallel horizontally spaced apart lateral rods disposed in V-blocks on the side walls of the second tube, each of said rods being disposed parallel with the longitudinal axis of the second tube;*

*h. two horizontally opposed supporting arms mounted to the front plate assembly each having a cylindrical hole therethrough, said holes being coaxial with the lateral rods; and*

*i. two frictionless bearings mounted within the holes on the supporting arms and supporting the movable front plate assembly in alignment with the lateral rods, whereby the center of support of the frictionless bearings is coincident with the center of gravity of the movable front plate assembly.*

*20. An interferometer as claimed in claim 19 wherein the cylindrical tubes, the fixed mirror assembly, the front*

*plate assembly, and the supporting arms are all fabricated from a common alloy.*

*21. An interferometer as claimed in claim 19 wherein said lateral rods are retained within the V-blocks by spring pins, thereby permitting compensation for the thermal expansion of the rods with respect to the interferometer.*

*22. An interferometer as claimed in claim 19 wherein said lateral rods are centerless ground stainless steel cylinders.*

*23. An interferometer as claimed in claim 19 further including a focusing mirror and a detector for detecting and measuring the interference patterns generated by the interferometer.*

*24. An interferometer for measuring the spectra of incident electromagnetic radiation, comprising:*

*a. first and second enclosed arms joined together with two flanges such that the arms make right angles with each other;*

*b. a beam splitter mounted at said flanges in optical alignment with said first and second arms;*

*c. a fixed mirror disposed in said first arm;*

*d. means for adjustably mounting said fixed mirror so that the orientation thereof can be precisely aligned with respect to the second arm;*

*e. a movable mirror disposed in said second arm;*

*f. means for mounting said movable mirror for movement toward and away from said beam splitter;*

*g. four mounting blocks integrally formed with said second arm and each having V-grooves precisely cut therein, two of said blocks being disposed in registry on one side of said second arm and two of said blocks being disposed in registry on the other side of said second arm;*

*h. two cylindrical rods laterally disposed in parallel spaced apart relationship by the V-grooves in said mounting blocks;*

*i. two headings supporting the means for mounting the movable mirror on the two cylindrical rods; and*

*j. motive means disposed exclusively within said second arm for causing movement of said movable mirror toward and away from said beam splitter.*

*25. In an interferometer for measuring the spectra of incident electromagnetic radiation, a platform, first and second circular hollow cylindrical arms having longitudinal axes, means for rigidly securing said first and second arms to each other at a junction so that the longitudinal axes extend at right angles to each other and to provide a unitary assembly of the first and second arms, a beam splitter mounted between said first and second arms at the junction of said first and second arms, a fixed mirror carried in said first arm spaced from the beam splitter, a movable mirror spaced from the beam splitter, means mounting said movable mirror in said second arm to permit movement of the movable mirror along the longitudinal axis of the second arm, motive means carried by said second arm for causing movement of said movable mirror along the longitudinal axis of said second arm, means for supporting said first and second arms on said platform, a source of white light mounted on said second arm, a secondary fixed mirror mounted in said first arm proximate to said first named fixed mirror, a secondary movable mirror mounted in said second arm proximate to and movable with said first named movable mirror, a secondary beam splitter mounted between said first and second arms proximate to said first named beam splitter for separating the white light into two parts and for subsequently recombining the two parts of the white light after reflection from the secondary fixed mirror and the secondary movable mirror, and a white light detector mounted on the interferometer for receiving recombined white light from the secondary beam splitter whereby an optical measuring point for the interferometer can be determined.*

* * * * *